(12) United States Patent
Sakurai et al.

(10) Patent No.: US 10,603,825 B2
(45) Date of Patent: Mar. 31, 2020

(54) FIBER-REINFORCED RESIN MOLDED ARTICLE, MANUFACTURING METHOD, AND MANUFACTURING APPARATUS FOR FIBER-REINFORCED RESIN MOLDED ARTICLE

(71) Applicant: HONDA MOTOR CO., LTD., Minato-ku, Tokyo (JP)

(72) Inventors: Motoki Sakurai, Tochigi-ken (JP); Kenji Hayashi, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 15/883,117

(22) Filed: Jan. 30, 2018

(65) Prior Publication Data

US 2018/0222095 A1    Aug. 9, 2018

(30) Foreign Application Priority Data

Feb. 3, 2017   (JP) .................................. 2017-018840

(51) Int. Cl.
    *B29C 45/14*    (2006.01)
    *B29L 31/00*    (2006.01)

(52) U.S. Cl.
    CPC .... *B29C 45/1418* (2013.01); *B29C 45/14336* (2013.01); *B29C 45/14786* (2013.01); *B29L 2031/7146* (2013.01); *B60Y 2410/10* (2013.01)

(58) Field of Classification Search
    CPC .......... B29C 45/1418; B29C 45/14336; B29C 45/14786; B60Y 2410/10; B29L 2031/7146
    See application file for complete search history.

(56) References Cited

U.S. PATENT DOCUMENTS 10,322,559 B2    6/2019    Taniguchi et al.
2004/0262322 A1    12/2004    Middleton et al.

FOREIGN PATENT DOCUMENTS

| CN | 103764729 | 4/2014 |
| JP | 3628438 | 11/1997 |
| JP | 2005-519819 | 7/2005 |
| JP | 2017-013456 | 1/2017 |
| WO | 2014/157013 | 10/2014 |

OTHER PUBLICATIONS

Japanese Office Action for Japanese Patent Application No. 2017-018840 dated Oct. 16, 2018.
Chinese Office Action for Chinese Patent Application No. 201810111721.8 dated Oct. 22, 2019.

*Primary Examiner* — Michael C Miggins
(74) *Attorney, Agent, or Firm* — Amin, Turocy & Watson, LLP (57) ABSTRACT

A fiber-reinforced resin molded article is molded into a three-dimensional shape on the basis of a sheet-shaped base material containing a fiber-reinforced resin. The fiber-reinforced resin molded article includes three-way directed corner portions constituted by plate sections joined in three mutually different directions. The fiber-reinforced resin molded article includes wrinkles that protrude from the differently directed corner portions by folding the sheet base material, and thick-walled sections which are laminated at sites where at least the wrinkles are formed.

8 Claims, 5 Drawing Sheets

PRIOR ART

FIBER-REINFORCED RESIN MOLDED ARTICLE, MANUFACTURING METHOD, AND MANUFACTURING APPARATUS FOR FIBER-REINFORCED RESIN MOLDED ARTICLE

CROSS-REFERENCE TO RELATED APPLICATION

This application is based upon and claims the benefit of priority from Japanese Patent Application No. 2017-018840 filed on Feb. 3, 2017, the contents of which are incorporated herein by reference.

BACKGROUND OF THE INVENTION

Field of the Invention

The present invention relates to a fiber-reinforced resin molded article using a fiber-reinforced resin as a material thereof, a method of manufacturing such a fiber-reinforced resin molded article, as well as an apparatus for manufacturing the same.

Description of the Related Art

Fiber-reinforced resin molded articles made from fiber-reinforced resin are used in various applications owing to their light weight and high rigidity. This type of fiber-reinforced resin molded article, for example, as shown in Japanese Patent No. 3628438, is molded in certain cases into a three-dimensional shape (box body) having differently directed corner portions in which plate sections thereof are connected in three different directions.

Incidentally, in the case of manufacturing a fiber-reinforced resin molded article having differently directed corner portions by press molding a molding die, a sheet-shaped base material is folded into the fiber-reinforced resin molded article, whereby wrinkles tend to develop in folded portions in the vicinity of the differently directed corner portions. In addition, if the wrinkles are large, the base material may develop doubly folded portions (folded portions folded upon themselves) therein. When the folded portions are formed in this manner, by sandwiching the folded portions in press molding, a high pressing pressure is applied to the folded portions, whereas a small pressing pressure is applied to the other portions apart therefrom. As a result, the fiber reinforced resin molded article becomes unintentionally deteriorated in terms of basis weight (weight per unit area), and further, the generated wrinkles cause the strength of the molded article to be insufficient.

For this reason, conventionally, a cutting step of partially cutting the sheet-shaped base material is performed before press molding is carried out, so that folded portions are not formed in the fiber-reinforced resin molded article during press molding. However, when such a cutting step is performed, labor and cost increase at the time of manufacturing the molded article.

SUMMARY OF THE INVENTION

The present invention has been devised in view of the aforementioned circumstances, and has the object of providing a fiber-reinforced resin molded article, a method of manufacturing such a fiber-reinforced resin molded article, as well as an apparatus for manufacturing the same, which with a simple configuration, are capable of obtaining sufficient strength, together with reducing labor at a time of manufacturing the fiber-reinforced resin molded article.

In order to achieve the aforementioned object, the present invention is characterized by a fiber-reinforced resin molded article molded in a three-dimensional shape on the basis of a sheet-shaped base material including a fiber-reinforced resin, wherein the fiber-reinforced resin molded article comprises differently directed corner portions constituted by plate sections joined in three or more mutually different directions, wrinkles that protrude in a plate thickness direction from the differently directed corner portions, or from plate sections in the vicinity of the differently directed corner portions due to a variation in substance that constitutes the base material during molding thereof, and thick-walled sections which are laminated at sites where at least the wrinkles are formed.

According to the above features, in the fiber-reinforced resin molded article, by the thick-walled sections being laminated at sites containing the wrinkles that are formed in the differently directed corner portions, it is possible to form the fiber reinforced resin molded article without considering the occurrence of wrinkles. Consequently, it is possible to mold the molded article with high accuracy by applying the pressing pressure according to design at the time of molding. In addition, the thick-walled sections suppress a decrease in the strength of the fiber-reinforced resin molded article due to the occurrence of wrinkles. Further, the thick-walled sections can easily be laminated onto the wrinkles protruding from the plate thickness at the differently directed corner portions or in the vicinity of the differently directed corner portions, and thus the manufacturing process of the fiber reinforced resin molded article can be simplified.

In addition, the thick-walled sections may be injection molded portions formed integrally with the differently directed corner portions by injection molding.

By carrying out injection molding in this manner, in the fiber-reinforced resin molded article, the injection molded portions that constitute the thick-walled sections can be formed easily, and it is possible to further shorten the manufacturing time.

Further, the wrinkles preferably are formed by folded portions in which the base material is folded, and the thick-walled sections preferably cover the folded portions including the differently directed corner portions.

In accordance with this feature, it is possible to further enhance the strength of the sites where the folded portions are expected to be formed.

In this instance, a flange member, which is constituted by being bent in a further different direction, may be provided on the differently directed corner portions, and the thick-walled sections may also be laminated onto the flange member.

In this manner, by laminating the thick-walled sections onto the flange member, it is possible to cover the wrinkles (folded portions) that have a possibility of occurring also on the flange member, and the strength in the vicinity of the flange member can be enhanced.

Further, the amount by which the thick-walled sections protrude from surfaces of the differently directed corner portions is preferably greater than the amount by which the flange member protrudes.

In accordance with this feature, the thick-walled sections reliably cover the flange member at the differently directed corner portions, and thus the strength of the fiber-reinforced resin molded article can be further enhanced.

Furthermore, the fiber reinforced resin may contain carbon fibers as a reinforcing material thereof.

In this manner, by including the carbon fibers as a reinforcing material thereof, the fiber-reinforced resin molded article is imparted with sufficient strength, and furthermore, by the thick-walled sections, the locations where wrinkles are expected to occur can be reinforced.

Further, in order to achieve the aforementioned object, the present invention is characterized by a manufacturing method for a fiber-reinforced resin molded article for molding a three-dimensionally shaped fiber-reinforced resin molded article on the basis of a sheet-shaped base material containing a fiber-reinforced resin, the manufacturing method comprising a press molding step of molding differently directed corner portions constituted by plate sections joined in three or more mutually different directions by folding the base material by pressing with a molding die, and wrinkles that protrude in a plate thickness direction from the differently directed corner portions, or from plate sections in the vicinity of the differently directed corner portions due to a variation in substance that constitutes the base material, and an injection molding step of injecting a molding material into a cavity of the molding die by an injection molding machine, and laminating thick-walled sections at sites where the wrinkles, which have been inserted into the cavity, are formed.

Further, in order to achieve the aforementioned object, the present invention is characterized by a manufacturing apparatus for a fiber-reinforced resin molded article for molding a three-dimensionally shaped fiber-reinforced resin molded article on the basis of a sheet-shaped base material containing a fiber-reinforced resin, comprising a molding die adapted to mold differently directed corner portions constituted by plate sections joined in three or more mutually different directions by folding the base material by pressing, and wrinkles that protrude in a plate thickness direction from the differently directed corner portions, or from plate sections in the vicinity of the differently directed corner portions due to a variation in substance that constitutes the base material, a cavity disposed in the molding die and into which the wrinkles enter during pressing, and an injection molding machine adapted to inject a molding material into the cavity of the molding die, and to laminate thick-walled sections at sites where the wrinkles, which have been guided into the cavity, are formed.

According to the present invention, the fiber-reinforced resin molded article, the method of manufacturing the fiber-reinforced resin molded article, and the manufacturing apparatus for producing the same, with a simple configuration, are capable of obtaining sufficient strength, together with reducing labor at the time of manufacturing the fiber-reinforced resin molded article.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a fiber-reinforced resin molded article, a method of manufacturing such a fiber-reinforced resin molded article, and a manufacturing apparatus for producing the same according to the present invention will be described in detail below with reference to the accompanying drawings.

A fiber-reinforced resin molded article 10 (hereinafter also referred to simply as a molded article) according to an embodiment of the present invention is a manufactured product made of carbon fiber-reinforced plastic (CFRP) in which carbon fibers are used as a reinforcing material thereof. The molded article 10 is formed into a predetermined shape on the basis of a thermoplastic sheet-shaped base material 12 (a so-called prepreg material, hereinafter also referred to as a sheet base material).

The reinforcing material of the fiber-reinforced resin molded article 10 is not limited to carbon fibers, and various other fibers can be applied thereto. As the reinforcing fibers, there can be applied any one of, for example, natural fibers including glass fibers, boron fibers, aramid fibers (Kevlar), polyethylene fibers (Dyneema), Zylon, silicon carbide fibers, metal fibers, mineral fibers, and cellulose, or alternatively, two or more of such fibers may be mixed. The reinforcing fibers can be applied in the form of a tape, a sheet, a mat, a fabric, a web shape, long fibers aligned in one direction, a tow, a woven fabric, a knit, a braid, and chopped short fibers having a length of less than 10 mm.

Figure 1:
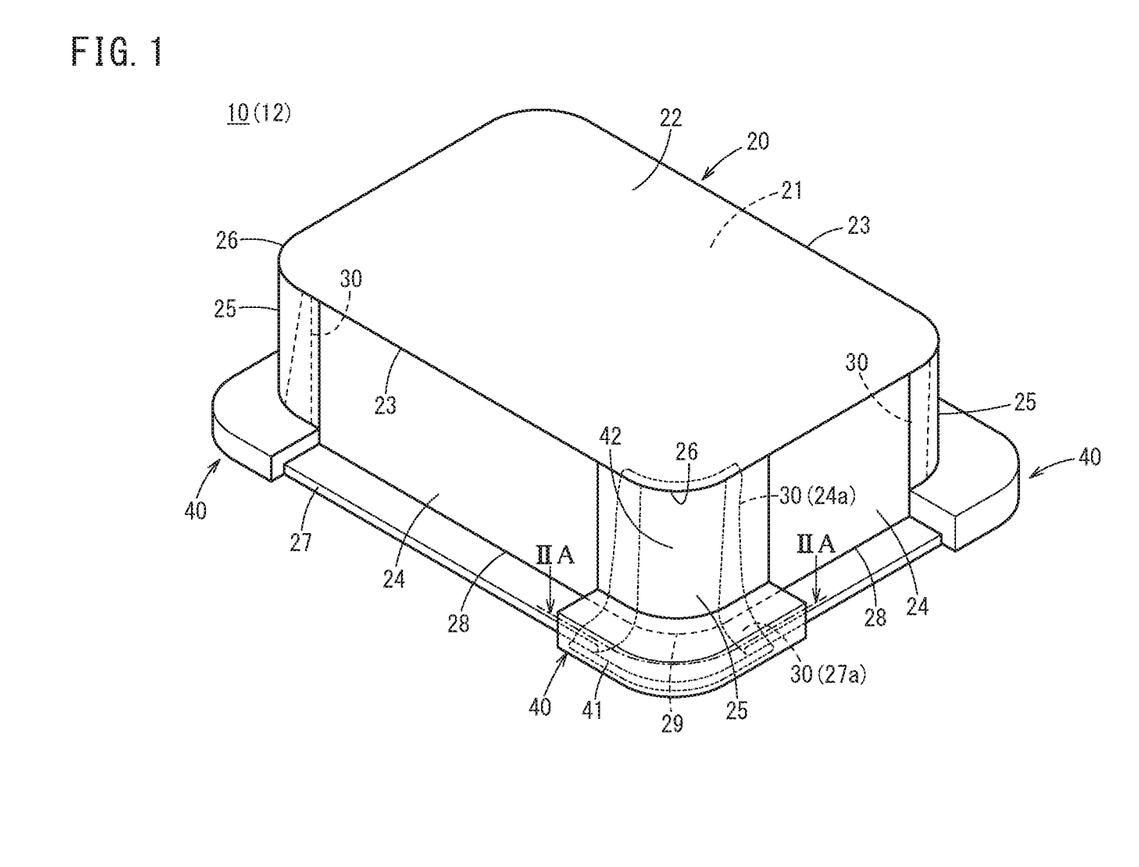
FIG. 1 is a perspective view of a fiber-reinforced resin molded article according to an embodiment of the present invention as viewed from a bottom wall side thereof.

Further, as shown in FIG. 1, the molded article 10 according to the present embodiment has a main body portion 20 molded into a three-dimensionally shaped box, and thick-walled sections 40 provided at the four corners of the main body portion 20. The molded article 10 is used as a battery box for protecting a vehicle battery. Therefore, the molded article 10 is mounted in the vehicle in a position that the user does not ordinarily see.

More specifically, the main body portion 20 of the molded article 10 is equipped with a rectangular bottom wall 22 as viewed in plan, and four side walls 24 connected to the four sides of the bottom wall 22 and extending in a direction (a substantially orthogonal direction) that differs from that of the bottom wall 22, and includes a space 21 on an inner side which is surrounded by the bottom wall 22 and the respective side walls 24. The respective side walls 24 protrude at the same height from the bottom wall 22, and the inner sides of extended end portions of the respective side walls 24 (end portions on a side opposite from the bottom wall 22) constitute an opening (not shown) which opens the space 21. In FIG. 1, a perspective view of the molded article 10 as viewed from the side of the bottom wall 22 is shown.

The four sides of the bottom wall 22 and the respective side walls 24 are continuous with each other via a bottom corner portion 23. Further, the adjacent side walls 24 are continuous with each other via a side corner portions 25. Therefore, the connecting locations between the bottom corner portions 23 and the side corner portions 25 constitute three-way directed corner portions 26 (differently directed corner portions) where respective plate sections (the bottom wall 22 and two of the side walls 24) meet each other in three different directions.

Furthermore, the main body portion 20 includes a flange member 27 that projects (outwardly) away from the space 21 on the outer side of the extended end portions of the side walls 24. The flange member 27 extends annularly going around the entire peripheral direction of the four side walls 24. The flange member 27 is used, for example, in order to assemble the molded article 10 together with another member.

In this manner, in the main body portion 20 having the flange member 27, the side walls 24 and the flange member 27 are continuous with each other via a flange corner portion 28. More specifically, the connecting locations between the flange corner portions 28 and the side corner portions 25 constitute three-way directed corner portions 29 (differently directed corner portions) where respective plate sections (the flange member 27 and two of the side walls 24) meet each other in three different directions. The three-way directed corner portions 26 and the three-way directed corner portions 29 lie adjacent to each other in a height direction of each of the side corner portions 25. Moreover, in the present embodiment, the bottom corner portions 23, the side corner portions 25, and the flange corner portions 28 are all formed with rounded corners, and therefore, the three-way directed corner portions 26, 29 are also formed with rounded corners.

The aforementioned main body portion 20 is formed by press working the sheet base material 12 which is heated and expanded during the manufacturing process. In press working thereof, the sheet base material 12 is formed into the bottom corner portions 23, the side corner portions 25, and the flange corner portions 28 by undergoing folding while the substance thereof is stretched and extended. In addition, as pressing progresses, a predesigned pressing pressure is applied to the stretched substance, whereby it is molded into the bottom wall 22, the four side walls 24, and the flange member 27.

Further, in press working thereof, by folding the side walls 24 around the bottom wall 22 as a reference point, the substance of the sheet base material 12 becomes gathered together and variations such as stretching and the like occur therein, and wrinkles 24a are naturally derived in the side walls 24 near the three-way directed corner portions 26. The wrinkles 24a protrude in the plate thickness direction of the side walls 24. In particular, stretched portions of the sheet base material 12 that occur due to the wrinkles 24a cause a reduction in strength from the fact that the plate thickness decreases.

Figure 2A:
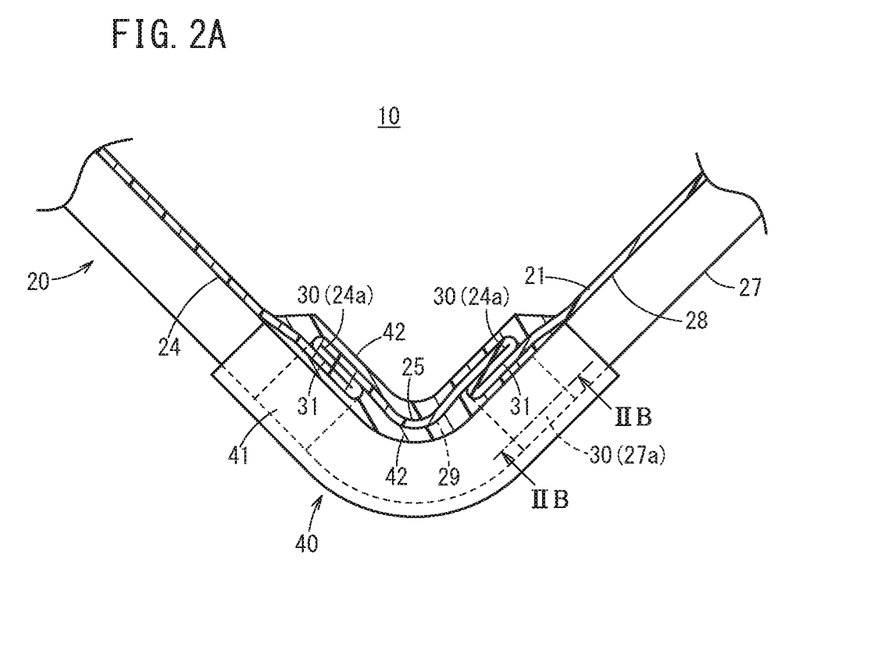
FIG. 2A is a cross-sectional view taken along line IIA-IIA of FIG. 1.

In addition, when large wrinkles 24a are brought about by the process of folding the sheet-shaped material into a three-dimensional shape at the side walls 24 in the vicinity of the three-way directed corner portions 26, then as shown in FIG. 2A, folded portions 30 are formed by the folded based material.

Figure 2B:
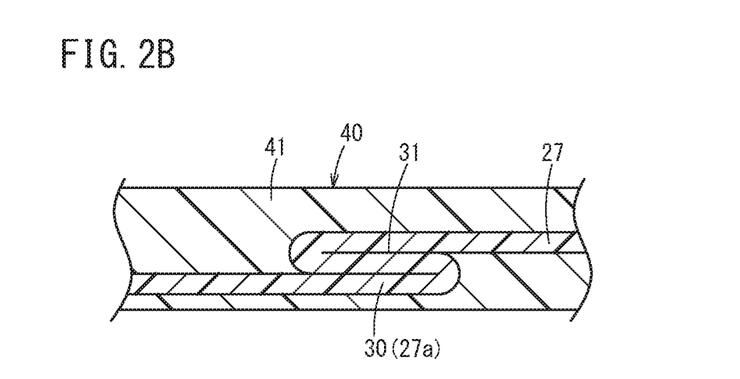
FIG. 2B is a cross-sectional view taken along line IIB-IIB of FIG. 2A.

Further, at the time of press working, the sheet base material 12 becomes gathered together and stretches also at the flange member 27 in the vicinity of the three-way directed corner portions 29, as the wrinkles 27a derived therefrom. If the wrinkles 27a at the flange member 27 are also formed to a large extent, then as shown in FIG. 2B, folded portions 30 where the base material is folded back on itself are formed. Accompanying the progression of pressing by the later-described manufacturing apparatus 50, the folded portions 30 are folded along the inner peripheral surface of the side walls 24 and the flange member 27. Therefore, the side walls 24 and the flange member 27 in the vicinity of the three-way directed corner portions 26, 29 become thicker by the amount that the folded portions 30 are folded back.

In the molded article 10, in order to reinforce the aforementioned partial reduction in strength of the main body portion 20 caused by the wrinkles 24a, 27a, thick-walled sections 40 are provided on each of the three-way directed corner portions 26, 29. The respective thick-walled sections 40 primarily include first resin portions 41, which are laminated onto outer surface sides of the flange member 27, and second resin portions 42, which are laminated onto the side walls 24. The first resin portions 41 and the second resin portions 42 are mutually continuous with the flange corner portion 28.

As shown in FIG. 2A, the first resin portions 41 project outwardly from the side walls 24 and cover the flange member 27. At this time, the first resin portions 41 are also injected onto and laminated over the gaps of the folded portions 30 which are formed in the flange member 27, thereby reinforcing the flange member 27 and the three-way directed corner portions 29. Further, the first resin portions 41 are curved so as to straddle across the side corner portions 25 from flat sections of the peripheral surface of the two side walls 24 that make up the three-way directed corner portions 29, as viewed in plan from the side of the bottom wall 22. Outer surfaces of the first resin portions 41 are curved smoothly along the peripheral surface of the main body portion 20 (side walls 24) at the rounded corners thereof.

Furthermore, the first resin portions 41 protrude outwardly from the side walls 24 with an amount of protrusion that is greater than the amount that the flange member 27 protrudes. The thickness of the parts of the first resin portions 41 that project out from the flange member 27 is formed to be thicker in comparison with the thickness of the parts of the first resin portions 41 that are laminated onto the flange member 27.

On the other hand, the second resin portions 42 are laminated onto the side walls 24 (including the side corner portions 25) of the main body portion 20, and are injected and laminated over gaps 31 of the folded portions 30 of the side walls 24. More specifically, together with the first resin portions 41, the second resin portions 42 also reinforce the side walls 24, the strength of which is lowered by the folded portions 30. The second resin portions 42 are disposed so as to embed the folded portions 30 of the main body portion 20, which are folded over toward the side of the space 21, from the inner peripheral surface of the main body portion 20, as well as on the outer peripheral surface of the side walls 24. In this instance, due to the influence of the cavities 60 at the time of press molding, there is a possibility that the side walls 24 and the side corner portions 25 may become molded to be somewhat inclined inwardly as viewed in planar cross-section (see FIG. 2A). The second resin portions 42 entirely cover the outer peripheral surface and the inner peripheral surface of the side walls 24 and the side corner portions 25, as described above. In particular, by the second resin portions 42 being disposed between the folded portions 30 of each of the side walls 24 with the side corner portions 25 sandwiched therebetween, the decrease in the plate-thickness of the side corner portions 25 becomes filled and compensated for by the folded portions 30 that lie adjacent to each other in the circumferential direction.

The four thick-walled sections 40 (the first resin portions 41 and the second resin portions 42) are fixed firmly to the main body portion 20, respectively, by insert molding of a molding material. The molding material constituting the thick-walled sections 40 is not particularly limited, and preferably a material (for example, a resin material) is applied having sufficient rigidity, and which is capable of being fixed to the main body portion 20 (a fiber-reinforced resin).

The thick-walled sections 40 partially cover the flange member 27 on outer sides of the three-way directed corner portions 29 with the thick first resin portions 41, and partially cover the inner peripheral surfaces and the outer peripheral surface of the side walls 24 with the thin second resin portions 42, whereby the weight of the molded article 10 as a whole can be reduced. Further, as noted above, since the molded article 10 is disposed at a location that is not visible to the user, even if the above-described thick-walled sections 40 are provided, the presence thereof does not affect the aesthetic appearance of the vehicle. Moreover, the thick-walled sections 40 may be formed into a suitable design by the mold at the time of insert molding.

Since the aesthetic appearance and the like of the molded article 10 is not taken into consideration as described above, although the locations where the folded portions 30 occur are exposed, no limitation is placed on the shape thereof. For example, in the molded article 10, the thick-walled sections 40 may continuously cover a range from the flange member 27 (the flange corner portion 28) up to the height of the bottom wall 22 (the bottom corner portion 23).

Figure 3A:
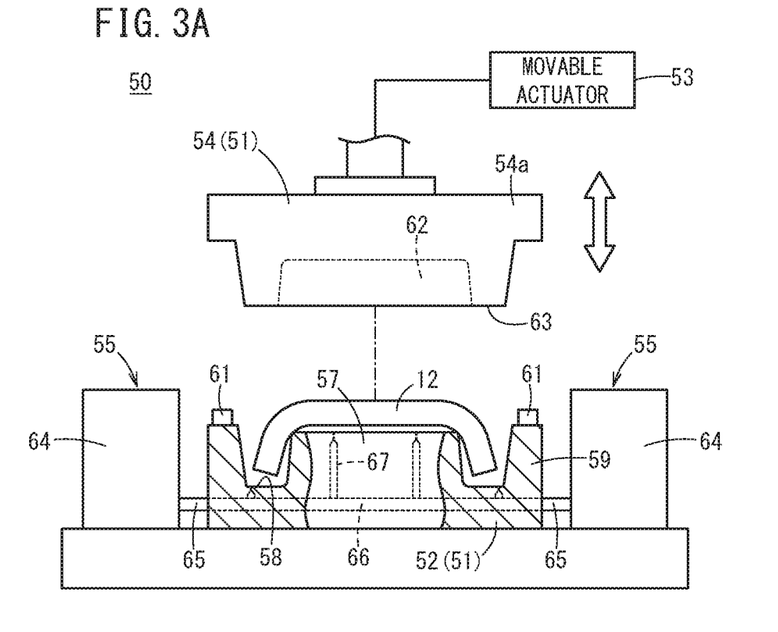
FIG. 3A is a side view schematically showing a manufacturing apparatus for molding the fiber-reinforced resin molded article shown in FIG. 1.
Figure 3B:
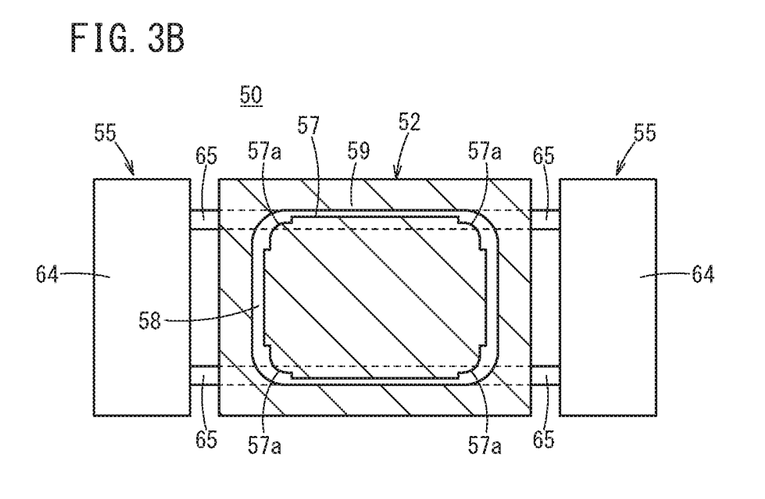
FIG. 3B is a plan view of a stationary die shown in FIG. 3A.

As shown in FIGS. 3A and 3B, in order to form the above-described molded article 10, the manufacturing apparatus 50 according to the present embodiment is constituted by an apparatus that carries out press working to form the main body portion 20, together with forming the thick-walled sections 40 by insert molding (press molding) during press working. More specifically, the manufacturing apparatus 50 includes a stationary die 52 as a press mold 51 (molding die), and a movable die 54 disposed on a movable actuator 53 which is movable relative to the stationary die 52. Further, the manufacturing apparatus 50 includes one or more (two as shown in FIG. 3A) injection molding machines 55 for providing the thick-walled sections 40.

The stationary die 52 is formed in a block-like shape and is fixed to a base of the manufacturing apparatus 50. The stationary die 52 includes a main block 57 that forms the interior of the main body portion 20, a molding groove 58 disposed on the side of the main block 57, and a sub-block 59 disposed on the side of the molding groove 58.

The main block 57 is a block that forms the bottom wall 22 of the main body portion 20 in cooperation with the movable die 54, and is formed in a rectangular shape as viewed in plan. An upper surface of the main block 57 is formed in a flat shape, and the heated and expanded sheet base material 12 is arranged thereon. Further, the main block 57 is designed to be smaller than the sheet base material 12, and the periphery of the sheet base material 12, which is arranged on the upper surface, is lowered downward by its own weight.

As shown in FIG. 3B, at the corner portions of the main block 57, recesses 57a are provided, which are adapted to receive the folded portions 30 when the molded article 10 is pressed. The recesses 57a are constituted by being recessed within a predetermined range in circumferential directions of the corner portions as viewed in plan, and are spatially continuous with the molding groove 58.

The molding groove 58 is a portion into which the movable die 54 is inserted at the time of pressing, and serves to form the flange member 27 of the molded article 10 at a lower bottom part which is formed in a flat shape. Further, the lower bottom part of the molding groove 58 is separated a predetermined distance in a mold-clamped state, whereby the injection molding machines 55 form the cavities 60 in which insert molding is carried out during pressing.

The sub-block 59 projects toward the movable die 54 at a greater amount than the main block 57. A spacer 61 for adjusting a bottom dead center position of the movable die 54 at the time of mold clamping is disposed at the protruding end of the sub block 59.

On the other hand, the movable die 54 of the manufacturing apparatus 50 is formed in a block-like shape, and includes a pressing space 62 in the interior thereof into which the main block 57 of the stationary die 52 and the sheet base material 12 are inserted during pressing. The pressing space 62 is formed in a rectangular shape with rounded corner portions for the purpose of molding the outer sides of (the main body portion 20 of) the molded article 10, and opens at the lower surface of the movable die 54. The pressing space 62 is formed with a size that is larger than that of the outer peripheral surface of the main block 57, by an amount corresponding to the thickness of the side walls 24 of the main body portion 20. The bottom portion (upper bottom part) of the movable die 54 constituting the pressing space 62 forms the bottom wall 22 of the main body portion 20, and an inner surface of the peripheral wall 63 of the movable die 54 constituting the pressing space 62 forms the side walls 24 of the main body portion 20. Furthermore, on sides located more outwardly than the peripheral wall 63 of the movable die 54, an abutting portion 54a is provided, which abuts against the spacer 61 of the stationary die 52 at the time of mold clamping.

Figure 4:
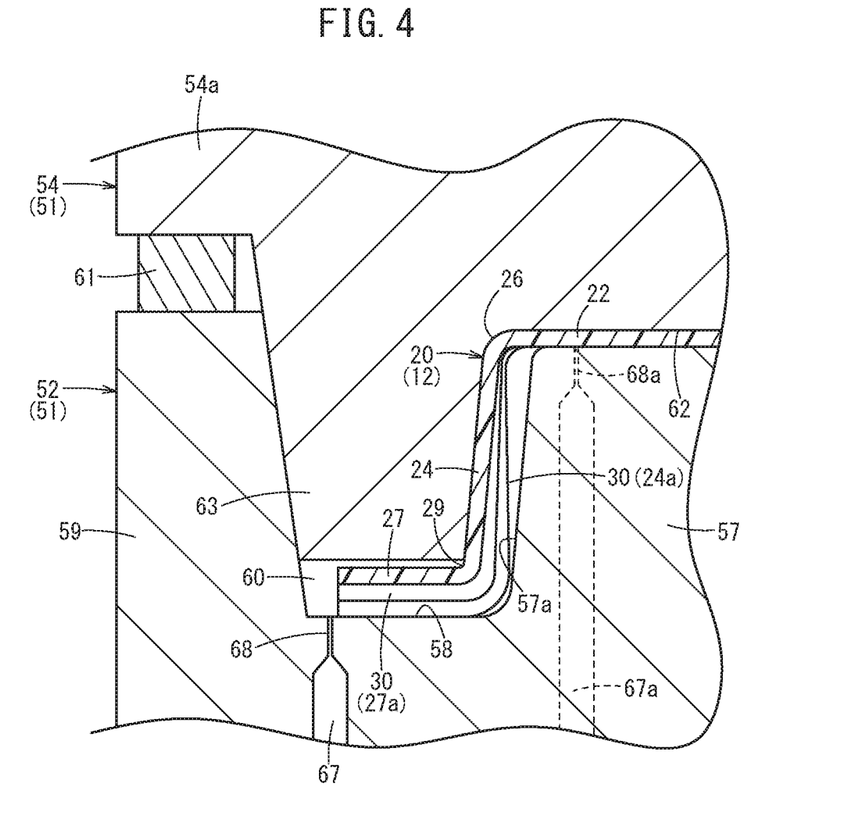
FIG. 4 is an enlarged cross-sectional view schematically showing the state of differently directed corner portions at a time of mold clamping of the manufacturing apparatus.

In the mold 51, in the mold-clamped state shown in FIG. 4, the side walls 24 of the molded article 10 are arranged between the main block 57 of the stationary die 52 and the peripheral wall 63 of the movable die 54, and in this state, the wrinkles 24a (folded portions 30), which are generated due to pressing, are accommodated in the recesses 57a. The recesses 57a are designed, with respect to the outer peripheral surface of the main block 57, with a depth which is slightly greater than three times the wall thickness of the side walls 24 in the main body portion 20 that is intended to be molded, and the recesses 57a possess a certain margin even when the folded portions 30 are accommodated therein. Accordingly, even if the folded portions 30 occur on the side walls 24 in the vicinity of the three-way directed corner portions 26, 29, it is possible to suppress any hindrance to pressing between the stationary die 52 and the movable die 54.

A guide mechanism (not shown) may be provided in the recesses 57a for the purpose of folding the folded portions 30, which have entered into the recesses 57a, so as to contact the inner peripheral surface of the side walls 24 of the main body portion 20. As such a guide mechanism, for example, it is possible to apply guide blocks, which are disposed to be capable of moving up and down within the recesses 57a, and are moved by a pressing pressure while bending the folded portions 30 during pressing of the movable die 54.

On the other hand, the cavities 60 have a sufficient height which is greater than the wall thickness of the flange member 27 (slightly more than three times the wall thickness of the flange member 27) that is formed as a result of being subjected to pressing and bending by the molding groove 58 of the stationary die 52. Therefore, even if the wrinkles 27a (folded portions 30) are formed in the flange member 27, the folded portions 30 can be reliably accommodated inside the cavities 60. Furthermore, a margin for enabling insert molding of the thick-walled sections 40 remains in the cavities 60. Further, in the mold-clamped state of the mold 51, the sub-block 59 and the peripheral wall 63 come into contact with each other, whereby the cavities 60 in the form of sealed spaces are created.

Returning to FIGS. 3A and 3B, a pair of injection molding machines 55 are provided on the base sandwiching the stationary die 52 therebetween. Each of the injection molding machines 55 includes an injection molding main body portion 64 and a pair of runners 65 (injection tubes) that extend from the injection molding main body portion 64 and are inserted into the interior of the stationary die 52. The injection molding machines 55 may be provided in the same number corresponding to the plurality of cavities 60 of the mold 51.

The injection molding main body portion 64 heats the resin material used for forming the thick-walled sections 40 to thereby generate molten resin, and supplies the generated molten resin to the pair of runners 65. Each of the runners 65 has an injection port at a distal end part thereof. The distal end parts communicate with the cavities 60 via spools 66, nozzles 67, and gates 68 of the stationary die 52 (see also FIG. 4). The spools 66 are formed on appropriate paths on a lower side of the stationary die 52, and the nozzles 67 are formed in the paths for allowing the resin material to flow upwardly at positions below the molding groove 58. Further, the runners 65 include in the interiors thereof screws and flow paths for the molten resin. Under rotary driving of the screws, the molten resin is made to flow, and is injected from the injection ports at the distal end parts. If each of the injection molding machines 55 is configured to inject the molten resin into two cavities 60 from a pair of runners 65 at the same timing, the manufacturing time can be shortened.

The molded article 10 and the manufacturing apparatus 50 according to the present embodiment are configured in the manner described above. Next, operations (a method of manufacturing the fiber-reinforced resin molded article 10) and effects of the present embodiment will be described below.

Figure 5A:
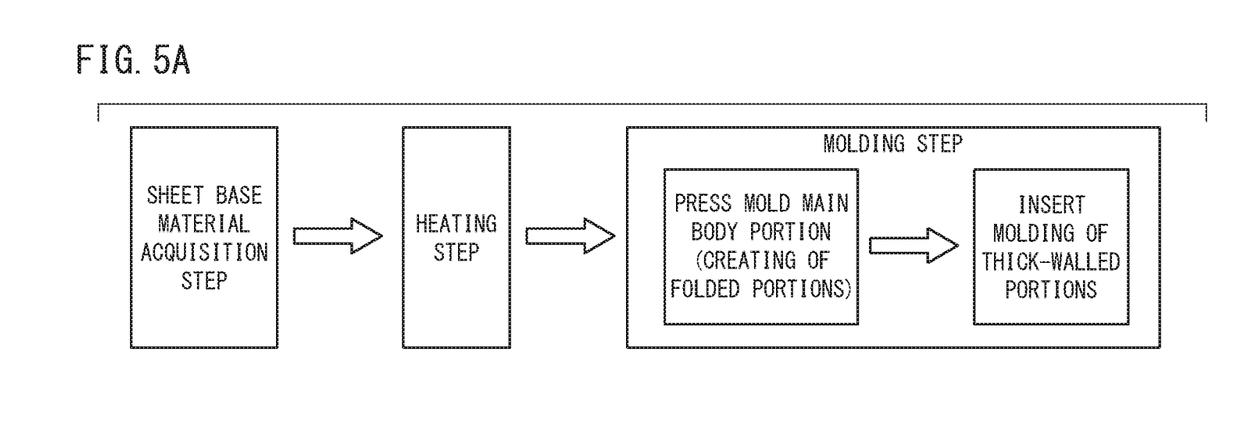
FIG. 5A is a flow diagram showing a method of manufacturing the fiber-reinforced resin molded article.

As shown in FIG. 5A, during manufacturing of the molded article 10, first, a sheet base material acquisition step is carried out for producing the sheet base material 12 of the molded article 10. Next, a heating step is carried out to heat the sheet base material 12 and cause the sheet base material 12 to expand. In addition, after the heating step, a molding step is carried out, in which the sheet base material 12 in a heated state is pressed to thereby press mold the main body portion 20, and furthermore, insert molding of the thick-walled sections 40 is performed.

More specifically, in the sheet base material acquisition step, the sheet base material 12 is manufactured in accordance with any well-known method. For example, a crystalline thermoplastic resin is molded into a film shape, unidirectionally or randomly oriented sheet-shaped carbon fibers (a reinforcing material) are sandwiched between the crystalline thermoplastic resins, and by carrying out heating and pressurizing in this state, the materials are mutually impregnated into each other to thereby obtain the sheet base material 12. Further, in the sheet base material acquisition step, a single sheet base material 12 may be obtained by laminating and integrating a plurality of films. Alternatively, in the sheet base material acquisition step, a sheet base material 12 which was manufactured in another factory or the like may be obtained.

In addition, in the heating step, the sheet base material 12 which was acquired in the sheet base material acquisition step is heated at a predetermined temperature (greater than or equal to a melting temperature of the thermoplastic resin), and the sheet base material 12 is expanded and softened. The device that performs heating is not particularly limited, and a device such as a far infrared heater, a heating plate, a high temperature oven, or a device that performs dielectric heating or the like may be applied thereto. The heating step may also be carried out while the sheet base material 12 is being conveyed to the manufacturing apparatus 50 shown in FIG. 3A.

In the molding step, the sheet base material 12 is placed and arranged manually or by a non-illustrated transport device on the upper surface of the main block 57 of the stationary die 52. In the arranged state, the periphery of the sheet base material 12 hangs down (undergoes plastic deformation) and assumes a shape that follows the shape of the main block 57. Thereafter, in the manufacturing apparatus 50, press molding (a press molding step) and insert molding (an injection molding step) are carried out. During press molding, the movable die 54 is moved toward the stationary die 52, whereby the movable die 54 comes into contact with the sheet base material 12, and furthermore, presses the sheet base material 12 inwardly toward the pressing space 62. Consequently, while the bottom wall 22 is formed with the main block 57, the sheet base material 12 is folded between the main block 57 and the peripheral wall 63, whereby the bottom corner portions 23 and the four side walls 24 are formed. When the four side walls 24 are formed, the folded portions 30 (wrinkles 24a, 27a) are generated in the vicinity of the three-way directed corner portions 26, 29. Although cases may occur in which the wrinkles 24a, 27a are not large enough to be folded, in the following explanation, a detailed description will be given with the assumption that the folded portions 30 are generated.

In this instance, as shown in FIG. 3B, the recesses 57a are formed at corner portions of the main block 57 of the stationary die 52. Therefore, the folded portions 30 of the side walls 24, which are generated due to pressing, smoothly enter (are guided) into the recesses 57a. Stated otherwise, the folded portions 30 do not interfere with movement of the movable die 54, and an inconvenience such as stoppage of operation of the manufacturing apparatus 50 or the like is suppressed.

Further, the stationary die 52 and the movable die 54 suppress any influence of the thickness of the folded portions 30 at the bottom dead center position (in the mold-clamped state) where the movable die 54 is pressed maximally into the stationary die 52, and therefore, it is possible to press the sheet base material 12 with a predesigned pressure distribution. More specifically, in a manufacturing apparatus which is not equipped with the recesses 57a, when the folded portions 30 are generated and the thickness is increased, the pressure of such portions increases, whereas the pressure of the other portions (i.e., the bottom wall 22 and the side walls 24) becomes insufficient. Consequently, there is a concern that the basis weight (weight per unit area) of the main body portion 20 due to pressing will not be in accordance with design. In contrast thereto, in the manufacturing apparatus 50 according to the present embodiment, since the folded portions 30 are accommodated in the recesses 57a, an insufficiency in pressure at other portions does not occur, and the main body portion 20 can be molded with high accuracy.

Further, when the movable die 54 approaches the bottom dead center position of pressing, the lower bottom part of the molding groove 58 bends the side walls 24, and the manufacturing apparatus 50 forms the flange corner portion 28 as well as the flange member 27. Then, when the movable die 54 reaches the bottom dead center position, the cavities 60, which are in a sealed state, are formed by the upper surface of the molding groove 58 of the stationary die 52 and the lower surface of the peripheral wall 63 of the movable die 54. In this state, the cavities 60 receive the folded portions 30 which have been generated in the flange member 27, and furthermore, spaces into which the molten resin is capable of flowing are constructed in the vicinity thereof. Then, the injection molding machines 55 of the manufacturing apparatus 50 inject the molten resin into the cavities 60 via the runners 65, thereby insert molding the thick-walled sections 40.

During insert molding, the injection molding machines 55 discharge the molten resin, whereby the molten resin is spread throughout the entirety of the sealed cavities 60. Consequently, accompanying cooling thereof, the molten resin is formed into the thick-walled sections 40 corresponding to the shape of the cavities 60. For example, as shown in FIG. 2A, the first resin portions 41 of the thick-walled sections 40 are laminated over the outer circumferential surfaces of the three-way directed corner portions 29 (the side walls 24 and the flange member 27).

Further, by the injection pressure of the injection molding, the molten resin that has flowed into the cavities 60 reaches the outer peripheral surface of the side walls 24, and covers the outer circumferential surfaces of the side corner portions 25 (the three-way directed corner portions 26, 29), together with entering into the gaps 31 of the folded portions 30. Furthermore, the molten resin also flows inside the side walls 24 from locations where the folded portions 30 do not exist in the cavities 60, and enters into the gaps 31 of the folded portions 30, and together therewith, a state is brought about in which the resin is laminated on the inner peripheral surfaces thereof. Stated otherwise, the second resin portions 42 fill and compensate for the respective folded portions 30 on the inner side of the side walls 24 with the three-way directed corner portions 26, 29 sandwiched therebetween, and furthermore, are formed on the opposite side of each of the folded portions 30. Owing thereto, portions where strength is reduced due to the occurrence of the wrinkles 24a, 27a or the like are reinforced.

In addition, after having formed the thick-walled sections 40, the manufacturing apparatus 50 releases the mold clamping state by moving the movable die 54 upward relative to the stationary die 52. Accompanying movement of the movable die 54 with respect to the stationary die 52, the molded article 10 is exposed from the stationary die 52, and in such an exposed state, the molded article 10 is taken out from the pressing space 62 and the cavities 60 by an ejecting mechanism which is provided in the stationary die 52. As shown in FIG. 1, the molded article 10 which has been removed from the stationary die 52 is of a state in which the thick-walled sections 40 are disposed at the three-way directed corner portions 26, 29 of the three-dimensionally shaped main body portion 20.

Figure 5B:
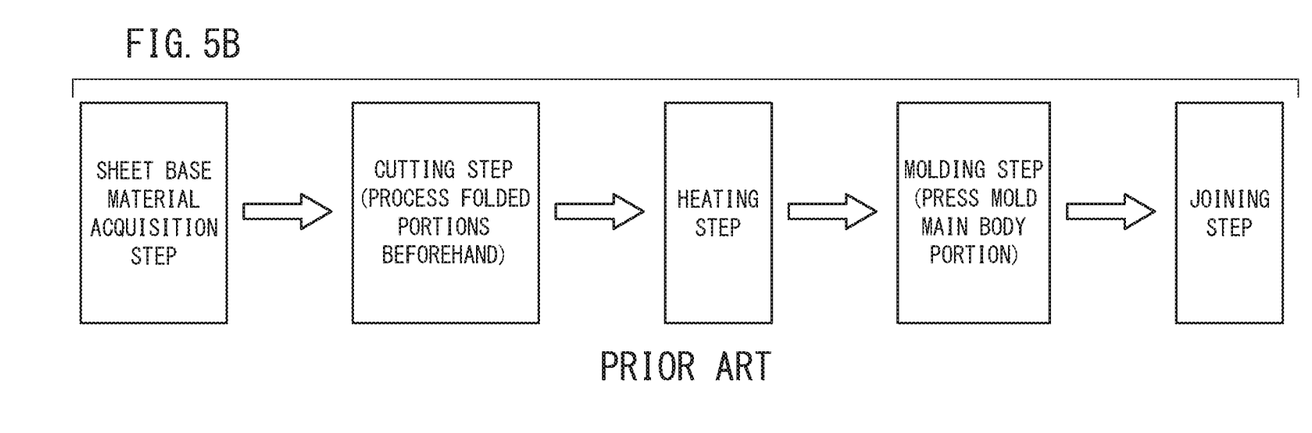
FIG. 5B is a flow diagram showing a conventional manufacturing method, which is illustrated as a comparative example.

As a comparative example for comparison with the manufacturing method of the present embodiment, a description will be given with reference to FIG. 5B concerning a general (conventional) manufacturing method for manufacturing a molded article 10 in a manner so that the folded portions 30 are not generated therein. According to such a conventional manufacturing method, after the sheet base material acquisition step, a cutting step of cutting the sheet base material 12 at locations where the folded portions 30 are to be formed is carried out. In accordance therewith, since the folded portions 30 are eliminated from the main body portion 20, in the heating step and the molding step (press molding of the main body portion 20), it is possible to mold the molded article 10 by applying a designed pressing pressure. Further, in the conventional manufacturing method, after the main body portion 20 has been press molded, it becomes necessary for a joining step of joining the adjacent side walls 24 (side corner portions 25) to be performed. As understood from the above, according to the conventional manufacturing method, by providing the cutting step and the joining step, a needless amount of effort and labor is incurred in the manufacturing operation.

In contrast thereto, as shown in FIG. 5A, the manufacturing apparatus 50 according to the present embodiment carries out the sheet base material acquisition step, the heating step, and the molding step without performing a cutting step. Consequently, it is possible to reduce labor at the time of manufacturing, and to manufacture the molded article 10 with high precision.

As described above, in the molded article 10 according to the present embodiment, the thick-walled sections 40 are laminated at sites where the folded portions 30, which are formed in the three-way directed corner portions 26, 29, are formed. Therefore, it is possible to carry out press molding without considering the occurrence of the folded portions 30 (the wrinkles 24a, 27a of the base material). Consequently, it is possible to mold the molded article 10 with high accuracy by applying the pressing pressure according to design at the time of molding. In addition, the thick-walled sections 40 suppress a decrease in the strength of the molded article 10 due to the occurrence of the folded portions 30. Further, the thick-walled sections 40 can easily be laminated with respect to the flange member 27 that protrudes from the three-way directed corner portions 29, and thus the manufacturing process of the molded article 10 can be simplified. Accordingly, the molded article 10 can be mass-produced efficiently.

In particular, if the molded article 10 is an injection molded component in which the thick-walled sections 40 thereof are formed integrally by injection molding, it is possible to further shorten the manufacturing time. In addition, as a result of the molded article 10 containing carbon fibers as a reinforcing material, the sheet-shaped base material can be folded by pressing, and a sufficient strength can be obtained.

Further, by forming a single thick-walled section 40 over two of the folded portions 30 with the three-way directed corner portion 29 being placed therebetween, it is possible to enhance the overall strength of the three-way directed corner portions 29. Furthermore, since the amount by which the thick-walled section 40 protrudes outwardly from the surface of the three-way directed corner portions 29 is greater than the amount by which the flange member 27 protrudes, the thick-walled sections 40 can reliably cover the flange member 27, and thus the strength of the molded article 10 can be further enhanced.

The present invention is not limited to the embodiments described above, and it is a matter of course that various modifications are possible in accordance with the essence and gist of the invention. For example, in the molded article 10 according to the present embodiment, a configuration is disclosed in which the folded portions 30 are folded inside the main body portion 20 (the side walls 24) and are covered with the thick-walled sections 40. However, a configuration may be provided in which, in the molded article 10, the folded portions 30 are formed on an outer side of the main body portion 20. Even in this case, for example, by forming recesses on an inner side of the peripheral wall 63 of the movable die 54, the folded portions 30 can be guided, and by injection molding the thick-walled sections 40 in the recesses, outer sides of the side walls 24 can be covered with the thick-walled sections 40.

Further, for example, the manufacturing apparatus 50 is not limited to having a configuration in which a resin material is injected into the cavities 60 of the mold 51 in the molding step. For example, a runner 67a and a gate 68a may be provided for injecting the molten resin into the upper surface of the main block 57 of the stationary die 52 (see FIG. 4). In this case, it is possible for the manufacturing apparatus 50 to guide the molten resin into the gaps and the cavities 60 of the folded portions 30, by injecting the molten resin (to a position where the movable die 54 is slightly separated from the stationary die 52) prior to mold clamping of the movable die 54. After injecting the molten resin, the manufacturing apparatus 50 may carry out mold clamping.

Furthermore, the folded portions 30 (the wrinkles 24a, 27a of the base material) which are formed on the molded article 10 are formed not only in the three-way directed corner portions 26, 29, but also occur in differently directed corner portions where four or more plate sections intersect. In the present invention, it is possible to provide the thick-walled sections 40 (to carry out insert molding) with respect to any type of differently directed corner portions generated by the folded portions 30. For example, a prediction tool or the like may be used to predict portions where the sheet base material 12 will become excessive, and the cavities 60 provided in the mold 51 may be formed in the mold 51 with an appropriate shape in accordance with such a prediction.

Moreover, formation of the thick-walled sections 40 on the three-way directed corner portions 29 (differently directed corner portions) may be carried out by an apparatus and process that differs from press molding the main body portion 20. More specifically, a manufacturing method may be used in which the main body portion 20 is subjected to press molding in advance by a pressing machine, the main body portion 20 is extracted from the pressing machine, and then, the main body portion 20 is set in an injection molding machine and the thick-walled sections 40 are formed by injection molding.

What is claimed is:

1. A fiber-reinforced resin molded article molded in a three-dimensional shape on a basis of a sheet-shaped base material containing a fiber-reinforced resin, wherein the fiber-reinforced resin molded article comprises:
    differently directed corner portions constituted by plate sections joined in three or more mutually different directions;
    wrinkles that protrude in a plate thickness direction from the differently directed corner portions, or from the plate sections in a vicinity of the differently directed corner portions due to a variation in substance that constitutes the base material during molding of the base material; and
    thick-walled sections which are laminated at sites where at least the wrinkles are formed.

2. The fiber-reinforced resin molded article according to claim 1, wherein the thick-walled sections are injection molded portions formed integrally with the differently directed corner portions by injection molding.

3. The fiber-reinforced resin molded article according to claim 1, wherein:
    the wrinkles are formed by folded portions in which the base material is folded; and
    the thick-walled sections cover the folded portions including the differently directed corner portions.

4. The fiber-reinforced resin molded article according to claim 1, wherein the fiber reinforced resin contains carbon fibers as a reinforcing material thereof.

5. The fiber-reinforced resin molded article according to claim 1, wherein:
    a flange member, which is constituted by being bent in a further different direction, is provided on the differently directed corner portions; and
    the thick-walled sections are also laminated onto the flange member.

6. The fiber-reinforced resin molded article according to claim 5, wherein an amount by which the thick-walled sections protrude from surfaces of the differently directed corner portions is greater than an amount by which the flange member protrudes.

7. A manufacturing method for a fiber-reinforced resin molded article for molding a three-dimensionally shaped fiber-reinforced resin molded article on a basis of a sheet-shaped base material containing a fiber-reinforced resin, comprising:
    a press molding step of molding, by folding the base material by pressing with a molding die, differently directed corner portions constituted by plate sections joined in three or more mutually different directions, and wrinkles that protrude in a plate thickness direction from the differently directed corner portions, or from the plate sections in a vicinity of the differently directed corner portions due to a variation in substance that constitutes the base material; and
    an injection molding step of injecting a molding material into a cavity of the molding die by an injection molding machine, and laminating thick-walled sections at sites where the wrinkles, which have been inserted into the cavity, are formed.

8. A manufacturing apparatus for a fiber-reinforced resin molded article for molding a three-dimensionally shaped fiber-reinforced resin molded article on a basis of a sheet-shaped base material including a fiber-reinforced resin, comprising:
    a molding die adapted to mold, by folding the base material by pressing, differently directed corner portions constituted by plate sections joined in three or more mutually different directions, and wrinkles that protrude in a plate thickness direction from the differently directed corner portions, or from the plate sections in a vicinity of the differently directed corner portions due to a variation in substance that constitutes the base material;
    a cavity disposed in the molding die and into which the wrinkles enter during pressing; and
    an injection molding machine adapted to inject a molding material into the cavity of the molding die, and to laminate thick-walled sections at sites where the wrinkles, which have been guided into the cavity, are formed.

* * * * *